Oct. 5, 1954

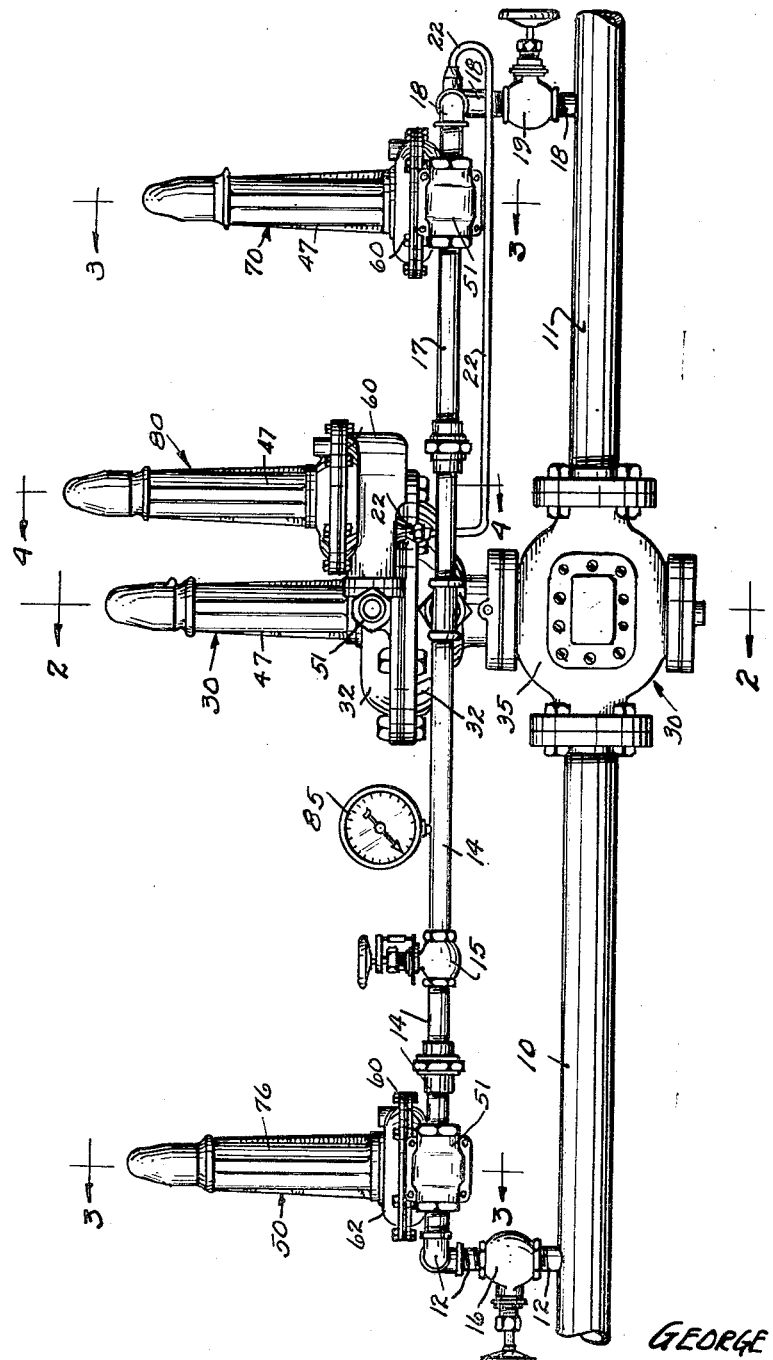

G. C. HUGHES 2,690,760

FLUID PRESSURE REGULATING SYSTEM

Filed Aug. 6, 1952

INVENTOR
GEORGE C. HUGHES
By Bates, Teare, & McBean
ATTORNEYS

Oct. 5, 1954

G. C. HUGHES 2,690,760

FLUID PRESSURE REGULATING SYSTEM

Filed Aug. 6, 1952

INVENTOR.
GEORGE. C. HUGHES
BY
Bates, Teare, & M<sup>c</sup>Bean
ATTORNEYS

Patented Oct. 5, 1954

2,690,760

UNITED STATES PATENT OFFICE 2,690,760

FLUID PRESSURE REGULATING SYSTEM

George C. Hughes, Anderson, Ind., assignor to Reynolds Gas Regulator Company, Anderson, Ind., a corporation of Indiana Application August 6, 1952, Serial No. 302,957

4 Claims. (Cl. 137—484.2)

This invention relates to improvements in systems for controlling fluid pressure to maintain, with high degree of accuracy, a predetermined pressure in an outlet or low pressure main despite fluctuations of pressure in an inlet or high pressure main and under wide variations in the volume of fluid that must flow from the high to the low pressure main to maintain the desired pressure in the low pressure main. This, therefore, is the general object of the present invention.

The invention is particularly concerned with improvements in or relating to the flow of gas from a high pressure supply main to a low pressure service main in distribution systems where it is desirable to maintain a predetermined pressure in the low pressure service main despite wide variations in the rate of flow of gas through the system, which rate has been found to vary materially at various times of the day. The invention provides an arrangement whereby when there is a demand for an increased volume of gas, or as it is commonly termed "flow demand," the system will automatically regulate itself to permit the passage of the required greater volume or flow of gas while maintaining a constant pressure in the service main. The invention contemplates the provision of a system which will avoid the use of complex arrangements of levers, weights, and the like, as has been customary in the past. Further the invention contemplates a system wherein the outlet pressure may be changed by a simple adjustment. The invention also provides a pressure regulating system having a regulating capacity relative to its fully opened capacity which is much greater than in systems used in the past. For instance, it has been found that the present invention provides a system which increases the regulating capacity from about thirty three per cent of the fully opened capacity (customary in the system used in the past) to about eighty per cent. These therefore are some of the more specific objects of this invention.

According to the present invention, there is provided an improved gas pressure regulating system wherein a valve is connected between a high pressure supply main and a low pressure service main to control the flow of gas from one main to the other, the valve being actuated by a pressure responsive diaphragm, one side of which is connected with the outlet side of an auxiliary high pressure regulator and with the inlet side of an auxiliary low pressure regulator, the inlet of the high pressure auxiliary regulator and the outlet of the low pressure auxiliary regulator being connected with the high and low pressure mains respectively, the former by a flow restricting device such as a needle valve. The other side of the diaphragm is biased by a settable spring, together with the fluid pressure in the service main. A relief valve is provided to relieve the biasing fluid pressure whenever the pressure in the surface main exceeds a predetermined maximum. The system is readily adjustable for different pressures in the service main by the provision of a single adjustment which controls the flow of gas through the low pressure regulator.

Other objects and advantages of the present invention will become more apparent from the following description of an embodiment thereof illustrated in the accompanying drawings in which:

Fig. 1 is an elevational view of the improved pressure regulating system;

Fig. 5 is a diagram illustrating the improved system.

Figure 4:
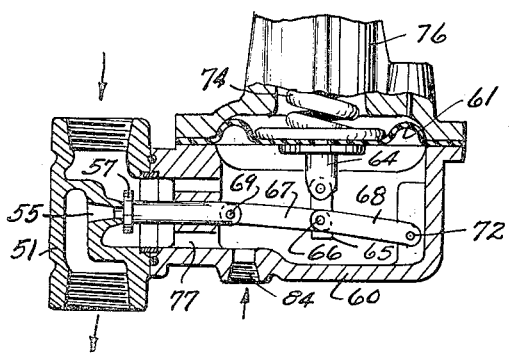
Fig. 4 is a vertical axial section through the lower portion of the relief valve, the plane of the section being parallel with that shown in Fig. 1.

Referring now to the drawings in detail and particularly to Figs. 1 and 5, there is shown a high pressure supply main 10 which is connected with the inlet of a main control or regulating valve 30, the outlet of which is connected with a low pressure service main 11. The valve 30 is actuated by a pressure responsive diaphragm 31 which is mounted in a casing 32 surmounting the valve body 35. An auxiliary high pressure regulator 50 has its inlet connected with a high pressure main 10 by a conduit 12 and its outlet connected by a conduit 14 with a chamber 33 within the casing 32 below the diaphragm 31. A shut-off valve 16 is interposed in the conduit 12 between the supply main 10 and the regulator 50, and an adjustable needle valve 15 is interposed in the conduit 14 between the regulator 50 and the chamber 33.

An auxiliary low pressure regulator 70 is shown as having its inlet connected with the chamber 33 of the main regulator 30 by a conduit 17 which may be a continuation of the conduit 14. This auxiliary regulator has its outlet connected by a conduit 18 with the service main 11. A shut-off valve 19 is interposed in the conduit 18.

The service line 11 is connected with a chamber 34 within the casing 32 above the diaphragm 31. As shown this is accomplished by a conduit 20 which extends from the chamber 32 to the inlet chamber 81 of a pressure relief valve 80, hereinafter to be more fully described, through such chamber and a conduit 22 to the conduit 18 which connects with the service main 11 between the valve 19 and the regulator 70. A needle valve 23 is placed in the conduit 20 for purposes hereinafter to be more fully described.

Figure 2:
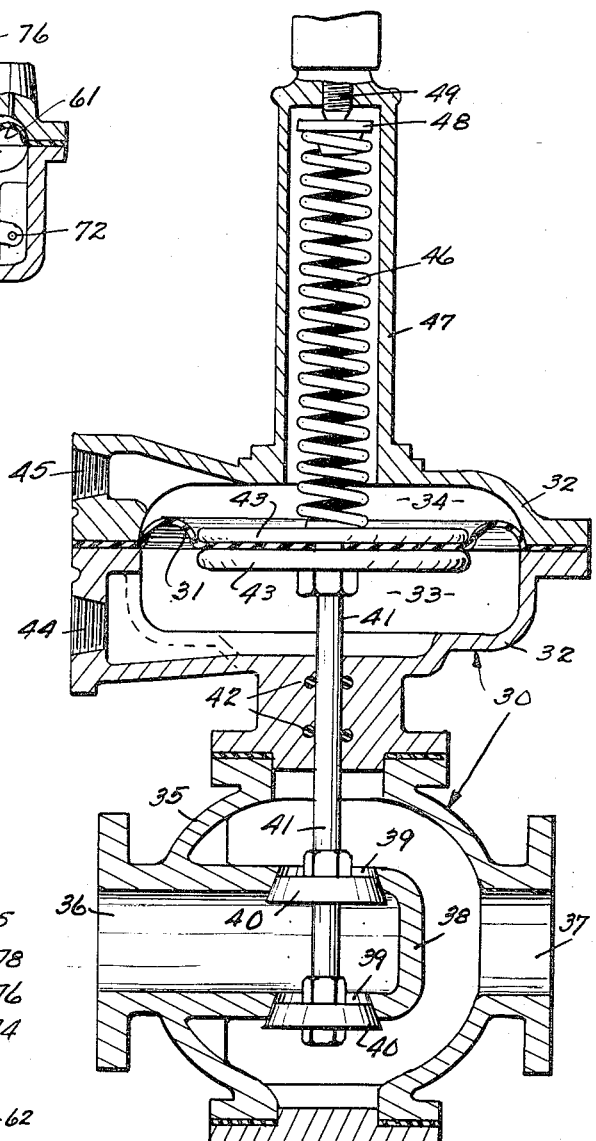
Fig. 2 is a vertical section through the main regulator, the upper portion of which has been rotated ninety degrees about a vertical axis from the position shown in Fig. 1 to simplify the illustration.

Many types of regulator structures may be used. Fig. 2 illustrates one type of main regulating valve which is well adapted for use in the present system. The valve 30, as there shown, comprises a hollow valve body 35 having an inlet and outlet openings 36 and 37 to which the supply and service mains are connected respectively. The inlet 36 is separated from the outlet 37 by a partition wall 38 having a pair of aligned valve port openings 39. The flow of fluid through the valve port openings is controlled by a pair of valve members 40 carried by a rod 41 which extends through the upper portion of the valve body 35 into the surmounting casing 32. Suitable means such as packing rings 42 are provided to prevent the seepage of gas into the casing 32 along the rod 41.

The casing 32 is separated into upper and lower chambers 34 and 33 respectively by the flexible diaphragm 31 which extends entirely across the casing. This diaphragm is conveniently positioned between upper and lower casing parts, which when secured together clamp the periphery of the diaphragm in place. The central portion of the diaphragm 31 is clamped between a pair of discs 43 which are secured to the valve rod 41 so that the movement of the diaphragm will be transmitted directly to the valve members 40. The conduits 14 and 17 which connect the high and low pressure auxiliary regulators with the chamber 33, as shown in Fig. 1, may be connected to opposite ends of a suitable pipe T 25, the other end of which is connected by a short conduit (not shown) with a threaded inlet opening 44 of the diaphragm chamber 33. Similarly the conduit 20 may be connected to a threaded inlet opening 45 formed in the wall of the chamber 34.

The main diaphragm 31 is preloaded by an adjustable spring 46 mounted within upwardly extending tubular portion 47 of the casing 32. This spring is interposed between the diaphragm and a washer 48 which is movable vertically in the extension 47. An adjusting screw 49 is threadingly mounted in the upper end of the extension 47 and adjustably engages the washer 48 to control the pressure of the spring on the diaphragm.

Figure 3:
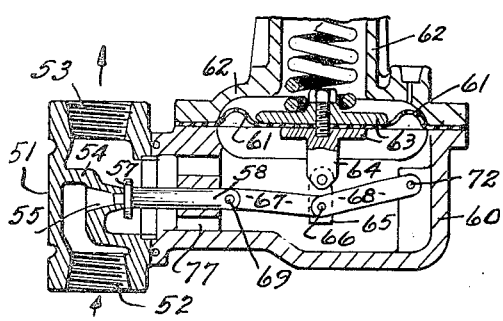
Fig. 3 is a vertical section through the auxiliary regulators, the planes of the section being indicated by the lines 3—3 on Fig. 1.
Figure 3:
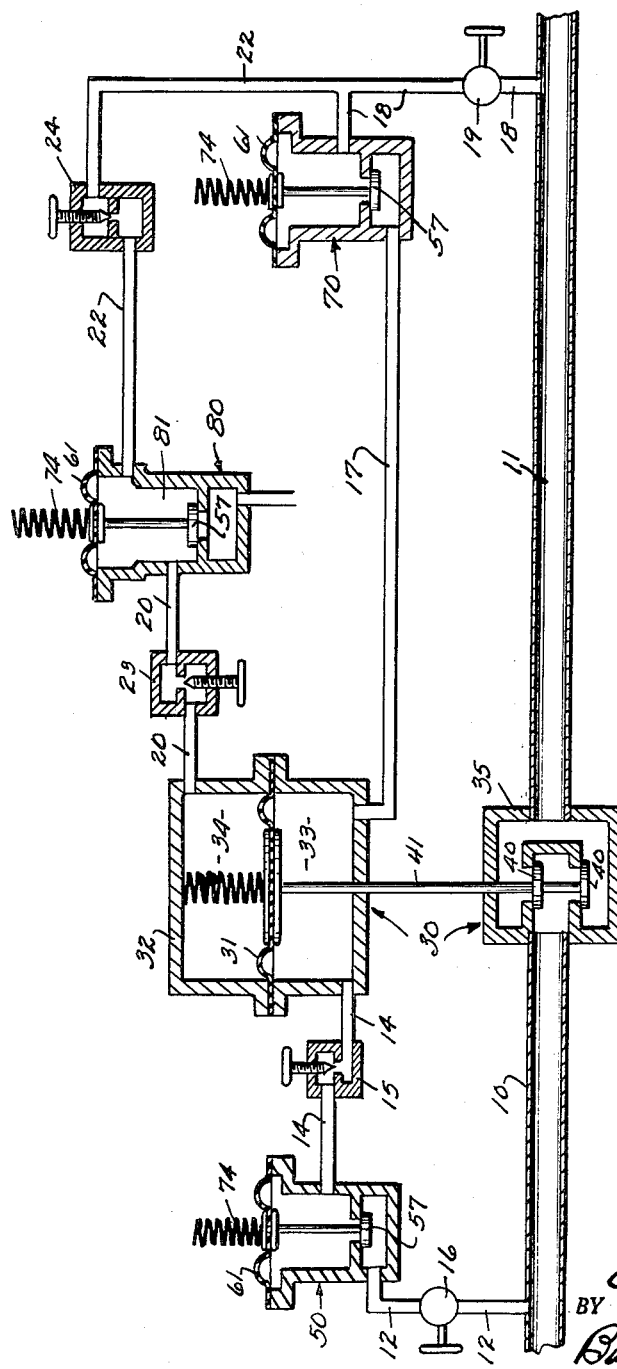

The auxiliary regulators 50 and 70 are substantially identical. A regulator suitable for this purpose is illustrated in Fig. 3 as comprising a body 51 having an inlet 52 and an outlet opening 53 separated by a partition wall 54 provided with a valve port opening 55. The flow of fluid through the port 55 is controlled by a valve member 57 mounted on one end of a rod 58 which is slidably mounted in the regulator body 60 for movement to and from the port. The body 60 is secured to the valve body by any well known means. As shown in Fig. 3, the valve body 51 has been rotated approximately ninety degrees in a horizontal plane from the position shown in Fig. 1.

This has been done for ease of illustration. As therein shown the regulator body 60 extends some distance to the right of the valve body 51 and provides an enlarged housing, the upper end of which is closed by a diaphragm 61 which is held in place by a hollow cap-like structure 62. The diaphragm 61 is clamped between two rigid discs 63 which are provided with a downwardly extending arm 64. This arm is connected by a link 65 with a pivot pin 66 which interconnects a pair of toggle-like links 67 and 68. The link 67 is connected between the pivot 66 and a pivot 69 formed on the inner end of the valve rod 58. The link 68 is connected between the pivot 66 and a fixed pivot 72 carried by the body 60. Accordingly, vertical movement of the diaphragm will move the valve member 57 to and from the valve port opening 55. Suitable communicating passageways 77 in the bodies 51 and 60 place the chamber 73 below the diaphragm 61 in communication with the pressure at the outlet side of the valve. The diaphragm 61 is biased by a spring 74 housed in an upwardly extending portion 76 of the cap 62. This spring extends between a washer 78 in the upper portion of the body 60 and the upper diaphragm supporting disc 63. An adjusting screw 75 is mounted in the upper end of the extension 76 and serves to regulate the spring pressure.

The pressure relief valve 80 as shown is of substantially the same construction as the auxiliary regulators. A suitable valve is illustrated in Fig. 4. The elements of this valve are identical with those shown in Fig. 3 and have been given the same identification. The structure shown in Fig. 4 differs from that shown in Fig. 3 in that the pivot 72 for the toggle link 68 of Fig. 4 is positioned below a line passing through the toggle pivots 66 and 69, whereas the pivot 72 of Fig. 3 is above such line. Accordingly in the structure shown in Fig. 3, the spring 74 tends to open the regulator and fluid pressure beneath the diaphragm 61 tends to close the regulator. These conditions are reversed in Fig. 4.

The improved system is well adapted for use for outlet pressures from ten to one hundred pounds and high pressures from one hundred and twenty-five to two hundred pounds.

A typical condition is one where inlet pressures vary from one hundred twenty-five to two hundred pounds and the desired outlet pressure is from ten to forty pounds. Assuming that the outlet or service pressure is to be forty pounds, the spring 46 of the main regulator 30 is adjusted to exert a pressure against its diaphragm 31, when the valve members 40 are seated, equivalent to a pressure of ten pounds per square inch over the entire area of the diaphragm 31. The spring is selected so that when the valve members 40 are wide open the spring still exerts some pressure against the diaphragm, for instance, four pounds. The high pressure regulator 50 is adjusted, by its spring adjusting screw 75, to provide an outlet pressure of sixty pounds at no flow. The needle valve 15 is partially opened to allow a small volume of gas under this sixty pound pressure to pass to the chamber 33 under the main diaphragm 31 of the valve 30. The low pressure auxiliary regulator 70 is set by its spring adjusting screw 75 to deliver the desired outlet pressure of forty pounds without closing. Under such conditions, and with a pressure in the service main 11 of slightly over forty pounds, there will be no flow through the auxiliary system which includes the auxiliary regulators 50 and 70, the main diaphragm chambers 33 and 34 and the associated conduits. At this time the downward force on the diaphragm 31 is fifty pounds per square inch (forty pounds gas pressure plus ten pounds spring pressure). This force is counter-balanced by a force of sixty pounds upward pressure in the chamber 33 below the main diaphragm, this pressure being supplied by the high pressure auxiliary regulator 50. The result is a differential of twenty pounds acting upward on the diaphragm to maintain the valves 40 closed. The relief valve 80 is set to relieve gas pressure in the chamber 34 in excess of forty-two pounds.

In operation, the lowering of the pressure in the low pressure service main 11, for instance by one pound, as caused by a demand for gas will immediately cause the pressure below the diaphragm 61 of the low pressure auxiliary regulator 70 to drop, opening its regulator valve 57 and allow gas to escape from the chamber 33 below the main diaphragm 31. Indeed this takes place before a one pound drop takes place, such drop having been selected to simplify the description of the operation. The pressure between the high pressure auxiliary regulator 50 and the needle valve 15 remains at sixty pounds, however as the valve 15 which restricts the flow in the conduit 14 is only partially open, the pressure in the chamber 33 drops instantly from sixty to thirty-nine pounds. At this time the pressures on the main diaphragm are thirty-nine pounds upwards as above described, and forty-nine pounds downward (ten pounds spring pressure plus thirty-nine pounds gas pressure, the latter being equal to the service line pressure). Accordingly, at this instant there is a pressure differential on the main diaphragm 61 of approximately ten pounds acting downward which immediately opens the main valves 40 permitting gas to flow from the high pressure service main 11. This restores the pressure in the low service main 11 to forty pounds. As the pressure in the service main 11 increases, the pressures below the diaphragm 61 of the auxiliary low pressure regulator also increase. This restricts the flow of gas from the diaphragm chamber 33 of the main regulator and permits the pressure in such chamber to be built up until it equals the combined gas and spring pressure in the upper diaphragm chamber 34 and as long as there is no change of pressure in the low pressure main 11, a restricted volume of gas will flow through the auxiliary system, the forces on opposite sides of the main diaphragm 31 will remain balanced, and the position of the valves 40 will remain unaltered.

Should there be a further demand on the low pressure service main for an increased volume or flow of gas, the pressure in such main would again drop, and the auxiliary low pressure regulator 70 would open wider in response to this drop. Such opening of the regulator 70 again would reduce the pressure beneath the diaphragm 31 whereupon the diaphragm would again be unbalanced and the spring 46 would act to further open the valves 40. Such further opening of the valves 40 would result in the restoration of the pressure in the service main 11 and the balancing of the pressures on the main diaphragm 31 without altering the position of the valves 40 as heretofore described. Accordingly, the valves 40 of the main regulator will automatically be adjusted to compensate for any increase in the demand for gas on the service main 11.

Should the demand for gas decrease the pressure in the service main 11 will increase closing the low pressure auxiliary regulator 70, whereupon the pressure in the chamber 33 beneath the diaphragm 31 builds up causing this diaphragm to raise and close the valve 30. The system, accordingly, adjusts itself immediately to any new flow condition. One of the features of the present invention is the fact that only one simple adjustment is required to change the outlet pressure. For instance if a ten pound outlet pressure is desired in the service main 11 the only adjustment required, is the adjustment of the spring 74 of the low pressure auxiliary regulator 70, so that the valve 57 would just remain open under a flow of gas at a pressure of ten pounds.

The relief valve 80 is provided to insure a rapid closing of the main valve 30 should the demand for gas suddenly decrease. A sudden decrease quickly causes the pressure in the low service main 11 to increase a considerable amount. As this increase might be effective immediately in chamber 34 and the upper side of the diaphragm 31, it is possible that under certain conditions it could cause the valve member 30 to open wider rather than to close. This condition is prevented by the relief valve 80. Any sudden increase of outlet pressure is instantly transmitted to the valve 80 through the line 22 and causes the valve to open thereby venting any pressure in the line 22 or above the diaphragm 31 as might exceed forty-two pounds. This insures immediate closing of the main valves 40 despite a sudden drop in the demand on the service main. The needle valve 23 is adjusted to restrict the flow through the conduit 20 and provides a time lapse to insure opening of the relief valve before the increased pressure reaches the main diaphragm 31.

When it is desired to use the system for service main pressures from forty to one hundred pounds, the spring 74 of the high pressure auxiliary regulator 50 is set to deliver one hundred and twenty pounds pressure to the main diaphragm chamber 33; the relief valve 80 is set to relieve pressures over one hundred and two pounds; and the spring 74 of the auxiliary low pressure regulator 70 is adjusted for the desired service main pressure. The system then operates as heretofore described in connection with service main pressures of from ten to forty pounds.

For ease of adjustment suitable pressure gauges, one of which is shown in Fig. 1 at 85, may be inserted in the conduit 14 between the high pressure auxiliary regulator 50 and its associated needle valve 15; in the conduit 20 between the chamber 34 of the main regulator and the relief valve 80; and in the conduit 22 between the relief valve 80 and the low pressure main 11.

The shut-off valves 16 and 18 are normally wide open. However, should it be desired to take the system out of operation it is only necessary that these two valves be closed entirely. The adjustment of the system need not be changed so that when again placed in operation readjustment is not required.

When using the improved system the diaphragm 31 may be of the same diameter for any outlet or service main pressure from say forty to one hundred pounds. The system entirely avoids the use of levers, weight, etc., and is extremely simple to adjust.

I claim:

1. In a system for regulating the flow of gas from a high pressure main to a low pressure main, a diaphragm operated valve interposed between said mains to control the flow of fluid from one main to the other, a high pressure auxiliary regulator having an inlet connected with the high pressure main and an outlet normally set for a predetermined outlet pressure greater than the desired low pressure, an auxiliary low pressure regulator having an inlet connected with the outlet of the high pressure regulator and an outlet connected with the low pressure main and normally set for the desired low pressure in the low pressure main, a chamber below the diaphragm of the main valve and a second chamber above said diaphragm, a connection between the chamber below said diaphragm and the inlet of the low pressure auxiliary regulator, a flow restricting valve between said high pressure auxiliary regulator and said first chamber, a conduit between the other chamber and the low pressure main, a spring in said second chamber acting on said diaphragm and tending to move said diaphragm operated valve to an open position, a connection between said second chamber and atmosphere, a relief valve in said connection to relieve the pressure in said last-named chamber when it exceeds a predetermined maximum.

2. In a system for regulating the flow of gas from a high pressure main to a low pressure main, a diaphragm operated valve interposed between said mains to control the flow of fluid from one main to the other, a high pressure auxiliary pressure regulator having its inlet connected with the high pressure main and an outlet normally set for a predetermined outlet pressure higher than the pressure desired in the low pressure main, an auxiliary low pressure regulator having an inlet connected with the outlet of the high pressure regulator and an outlet connected with the low pressure main and normally set for the desired low pressure in the low pressure main, a valve closing chamber below the diaphragm of the main valve and a valve opening chamber above said diaphragm, the valve closing chamber being connected between the inlet of the low pressure auxiliary regulator and the outlet of the high pressure auxiliary regulator, a needle valve between the outlet of the high pressure regulator and said closing chamber, a conduit between the opening chamber and the low pressure main, an adjustable spring in said chamber and acting on said diaphragm to tend to move the main valve to an open position, a fluid connection between said opening chamber and atmosphere, a relief valve in said connection to relieve the pressure in said last-named chamber when the pressure in the low pressure main exceeds a predetermined amount, and means to retard the action of the pressure in the low service main on the main diaphragm.

3. In a system for regulating the flow of gas from a high pressure main to a low pressure main, a valve interposed between said mains to control the flow of gas from one main to the other, a pressure responsive diaphragm to open and close said valve, a valve closing chamber at one side of the diaphragm, a valve opening chamber at the other side of said diaphragm, means connected with the high pressure line to deliver a limited flow of gas at a predetermined pressure higher than the desired outlet pressure to the valve closing chamber, means responsive to the pressure in the low pressure main to relieve the pressure in the closing chamber when the outlet pressure drops and to prevent the escape of such pressure when the outlet pressure rises while permitting a limited flow of gas when the outlet pressure is equal to that desired, a spring in said valve opening chamber and acting on said diaphragm in a direction to cause the diaphragm to move the main valve to an open position, a gas conduit between said valve opening chamber and the low pressure main to apply the low pressure to said diaphragm, and means to relieve the pressure in said valve opening chamber when the pressure in the low pressure main exceeds a predetermined maximum.

4. In a system for controlling the flow of gas from a high pressure supply main to a low pressure service main, a main valve disposed between said mains, an auxiliary system through which a limited volume of gas may flow from the supply to the service main, said auxiliary system including a diaphragm actuated gas pressure regulator having an inlet connected to the high pressure main and an outlet, said regulator being settable to deliver gas at a predetermined pressure greater than the desired pressure in the service main, a second diaphragm operated gas pressure regulator having an inlet connected with the outlet of the first named regulator and an outlet connected with the service main, said second regulator being settable to stop the flow of gas from the first regulator to the service main whenever the pressure in the service main exceeds the desired pressure, each of said regulators having an actuating diaphragm responsive to the pressures at their respective outlets and an adjustable biasing spring, a needle valve disposed between said regulators to restrict the flow of gas from the first regulator to the second regulator, a third pressure responsive diaphragm, an actuating connection between said third diaphragm and the main valve, a valve closing chamber at one side of said third diaphragm, a valve opening chamber at the other side of said third diaphragm, said last-named chamber being in communication with the service main, a spring in said last-named chamber and acting on said diaphragm in a direction to open said main valve, said closing chamber providing a gas expansion chamber between said needle valve and the second named regulator and a pressure relief valve having an inlet connected with the valve opening chamber and an outlet open to atmosphere, an adjustable flow restricting valve between the valve opening chamber and the relief valve, and a diaphragm to actuate said relief valve, said diaphragm being responsive to the service main pressure.

References Cited in the file of this patent

UNITED STATES PATENTS

| Number | Name | Date |
|---|---|---|
| 1,814,530 | Spence | July 14, 1931 |
| 1,878,060 | Thrall | Sept. 20, 1932 |
| 2,257,171 | King | Sept. 30, 1941 |
| 2,370,110 | Spence | Feb. 20, 1945 |